(12) United States Patent
Kairali et al.

(10) Patent No.: US 12,482,194 B2
(45) Date of Patent: Nov. 25, 2025

(54) AUGMENTED REALITY VISUALIZATION OF AN ACTION ON AN IDENTIFIED OBJECT

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 18/065,269

(22) Filed: Dec. 13, 2022

(65) Prior Publication Data

US 2024/0193874 A1  Jun. 13, 2024

(51) Int. Cl.
| | |
|---|---|
| G06T 19/00 | (2011.01) |
| G02B 27/01 | (2006.01) |
| G06T 13/40 | (2011.01) |
| G06V 10/74 | (2022.01) |

(52) U.S. Cl.
CPC ........ *G06T 19/006* (2013.01); *G02B 27/0172* (2013.01); *G06T 13/40* (2013.01); *G06V 10/761* (2022.01); *G02B 2027/0178* (2013.01); *G06V 2201/07* (2022.01)

(58) Field of Classification Search
CPC ..... G06T 19/006; G06T 13/40; G06V 10/761; G06V 2201/07
See application file for complete search history.

(56) References Cited

U.S. PATENT DOCUMENTS

| | | | |
|---|---|---|---|
| 8,386,414 B2* | 2/2013 | Bromenshenkel | G06F 3/04815 706/54 |
| 9,846,972 B2 | 12/2017 | Montgomerie et al. | |
| 11,190,606 B2* | 11/2021 | Einaudi | G06F 16/9538 |
| 2013/0158707 A1* | 6/2013 | Lee | G06N 5/02 901/46 |

(Continued)

FOREIGN PATENT DOCUMENTS

| | | | | |
|---|---|---|---|---|
| EP | 3037917 A1 * | 6/2016 | | G06F 3/01 |
| KR | 20190009081 A | 1/2019 | | |

(Continued)

OTHER PUBLICATIONS

Amores et al., "Smart Avatars: using avatars to interact with objects," CHI '12, May 5-10, 2012, Austin, Texas, USA, © 2012 ACM 978-1-4503-1015-4/12/05, 3 pgs.

*Primary Examiner* — Grace Q Li
(74) *Attorney, Agent, or Firm* — Jeffrey M. Ingalls (57) ABSTRACT

Provided is a computer-implemented method, system, and computer program product for displaying augmented reality (AR) visualization of a user action on an identified and/or recognized object. A processor may determine, for a user, an object interest level for each object of a plurality of known objects. The processor may detect one or more objects in an environment. The processor may identify, based on the object interest level, a first object of the one or more objects in the environment that is similar to at least one object of the plurality of known objects. The processor may determine, based on properties of the first object and the object interest level, an action for interacting with the first object. The processor may display, using an AR display, an avatar performing the determined action for interacting with the first object.

17 Claims, 5 Drawing Sheets

(56) References Cited

U.S. PATENT DOCUMENTS

| | | | |
|---|---|---|---|
| 2013/0307874 A1 | 11/2013 | Blanchflower et al. | |
| 2016/0232463 A1* | 8/2016 | McDonough | G06Q 50/01 |
| 2017/0293947 A1 | 10/2017 | Singh | |
| 2021/0266637 A1* | 8/2021 | Punja | H04N 21/4667 |
| 2021/0398183 A1* | 12/2021 | Jain | G06N 3/08 |
| 2022/0309756 A1* | 9/2022 | Kanno | A63F 13/65 |
| 2023/0278574 A1* | 9/2023 | Buda | G01C 21/3807 |
| | | | 701/301 |
| 2023/0295899 A1* | 9/2023 | Yamada | G06Q 50/265 |
| | | | 701/2 |

FOREIGN PATENT DOCUMENTS

| | | | |
|---|---|---|---|
| WO | 2012135554 A1 | 10/2012 | |
| WO | 2020021319 A1 | 1/2020 | |

\* cited by examiner

AUGMENTED REALITY VISUALIZATION OF AN ACTION ON AN IDENTIFIED OBJECT

BACKGROUND

The present disclosure relates generally to the field of augmented reality (AR) and, more specifically, to displaying AR visualization of a user action on an identified object.

AR is the integration of digital information with a user's environment in real time. Unlike virtual reality (VR), which creates a totally artificial environment, AR users experience a real-world environment with generated perceptual information overlaid on top of it. In most instances, AR is used to either visually change natural environments in some way or to provide additional information to users. The primary benefit of AR is that it manages to blend digital and three-dimensional (3D) components with an individual's perception of the real world. AR has a variety of uses, from helping in decision-making to entertainment. AR delivers visual elements, sound, and other sensory information to the user through a device like a smartphone or AR glasses. This information is overlaid onto the device to create an interwoven experience where digital information alters the user's perception of the real world. The overlaid information can be added to an environment or mask part of the natural environment.

Recognition of various types of objects and identifying associated properties of the objects in a surrounding are important tasks for a user while traversing an environment. For example, objects (e.g., a box, glass item, plant, insect, etc.) in a surrounding area may include properties associated with the given object such as weight, temperature (hot/cold), safety (e.g., poisonous, sharp, etc.). So, if the user wants to interact with the object, or is present nearby any object, then user may be impacted by the properties of the object. For example, an unseen broken glass shard on the ground may cut a user's foot or an unknown poisonous plant may cause the user to have a severe skin reaction. Therefore, a system and method are needed to identify objects in an environment and properly inform a user of potential issues related to the identified objects.

SUMMARY

Embodiments of the present disclosure include a computer-implemented method, system, and computer program product for displaying augmented reality (AR) visualization of a user action on an identified object. A processor may determine, for a user, an object interest level for each object of a plurality of known objects. The processor may detect one or more objects in an environment. The processor may identify, based on the object interest level, a first object of the one or more objects in the environment that is similar to at least one object of the plurality of known objects. The processor may determine, based on properties of the first object and the object interest level, an action for interacting with the first object. The processor may display, using an AR display, an avatar performing the determined action for interacting with the first object. This is advantageous over standard AR displaying techniques that only display various information and statistics using the AR device. Rather, this system displays an animated avatar that performs various actions on identified objects based on the user's interest level, which informs a user how to safely interact with the given object within the environment.

In some embodiments, the processor may determine the action for interacting with the first object by analyzing crowdsourced data associated with a plurality of actions for interacting with the first object or similar objects and select a best action for interacting with the first object from the plurality of actions. Using crowdsourced data for selecting the given action is advantageous over standard AR techniques that fail to utilize other users' actions for making predictions and/or determinations in a collaborative manner.

In some embodiments, the processor may determine an impact score for each action of the plurality of actions, where the impact score indicates how safe the action is for the user when interacting with the first object. The processor selects, based on the impact score for each action, the best action of the plurality of actions. This is advantageous over standard AR techniques that fail to assess a user's or object's impact when performing various actions related to the identified objects. This allows the processor to implement the safest actions and/or least impactful actions based on the crowdsourced data in relation to the given object.

In some embodiments, the processor may display, using the AR device and based on the impact score, a boundary between the avatar and the first object, where the boundary indicates a distance that the user may be in relation to the first object when performing the action. This allows the system to alert the user to maintain a certain distance between an unsafe object based on the object's known properties.

In some embodiments, the processor may display, based on the avatar crossing the boundary, a simulation of the avatar impacting or being impacted by the first object. This is advantageous by allowing the system to show what impact the user may experience if they do not follow the suggested actions.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of augmented reality (AR) and, more particularly, to displaying AR visualization of a user action on an identified and/or recognized object. While the present disclosure is not necessarily limited to such applications, various aspects of the disclosure may be appreciated through a discussion of various examples using this context.

Augmented reality (AR), which involves the use of specialized goggles, glasses, or smartphone apps to overlay digital information onto a user's real-life view, can help increase productivity, efficiency, and safety when interacting with objects within an environment. Not to be confused with virtual reality (VR), AR technology may produce statistics, calculations, and other information to give users increased understanding of their actual surroundings. Augmented reality has many applications for various industries such as manufacturing, industrial, leisure, entertainment, and the like. AR is quickly becoming recognized as a helpful tool for navigating various environments and/or situations and not just a toy for consumers. Unlike, virtual reality (VR) which immerses the user completely in a digital world, AR superimposes digital information onto the user's view of the real world. Because AR remains rooted in what is happening around you, it can be used for many day-to-day tasks.

Recognition of various types of objects and identifying associated properties of the objects in a surrounding are important tasks for a user while traversing an environment. For example, objects (e.g., a box, glass item, plant, insect, etc.) in a surrounding area may include properties associated with the given object such as weight, temperature (hot/cold), safety (e.g., poisonous, sharp, etc.). So, if the user wants to interact with the object, or is present nearby any object, then user may be impacted by the properties of the object. For example, an unseen broken glass shard on the ground may cut a user's foot or an unknown poisonous plant may cause the user to have a severe skin reaction. Therefore, a system and method are needed to identify objects in an environment and properly inform a user of potential issues related to the identified objects.

Embodiments of the present disclosure include a system, computer-implemented method, and computer program product that are configured to identify various objects within an environment using image recognition and display, using an AR device, an avatar performing an action for interacting with the identified object(s) based on the user's interest in the given object(s). In embodiments, the system may collect and analyze crowdsourced data from AR devices (AR glasses, goggles, smartphone, and the like) of other users in any physical surrounding/environment to collaboratively identify various objects in the environment. In embodiments, the system may rank/score the identified objects and the given properties of the objects based on what types of impact the object may have with respect to the user (positively or negatively) present in the surrounding/environment. Based on the impact and/or interest of the user, the system may determine an appropriate action for the user to perform in relation to the identified object. Accordingly, the AR device will display to the user one or more avatars performing the action in relation to the object and/or object properties so that user can identify what type of impact the user may have when interacting with the identified object(s) the user is interested in.

In embodiments, the system may analyze a profile of the user (e.g., user preferences, user action preferences, user interests in known objects, etc.) and identify the level of interest of the user in various known objects. In some embodiments, the system may utilize natural language processing/understanding to analyze the user's interest from various sources such as social media feeds, inputted preferences, and the like. For example, the user's profile may indicate the user is interested in photography and specimen collection etc., within a specific environment. Accordingly, the user's AR device will display one or more avatars performing similar actions (photographing objects, collecting non-hazardous specimens, maintaining a distance from hazardous objects, etc.) that the user is interested in on any identified objects matching the user's interest within the environment. In this way, the AR device allows the user to understand how the user's actions impact the objects.

In embodiments, once the object is identified, the system may determine how the user should interact with the identified object. For example, based on searching a knowledgebase of known properties of similar objects and the user's interest level, the system may determine the appropriate action for interacting with the object. For example, if the identified object is determined to be hazardous based on various properties (e.g., sharp object, scalding hot, slippery, etc.) the system may determine that the best action is to avoid touching the object.

In embodiments, the avatar actions may be generated based on crowdsourced data collected from other AR devices. For example, the system may use a crowdsourced AR device data feed to identify how the identified object can be viewed or interacted with in a better manner based on relative position and angular direction of other users' actions. In this way, the system uses a collaborative approach to determine the best actions for interacting with the identified object by analyzing other users' actions with respect to the objects within the environment. For example, the system may analyze crowdsourced data that includes a plurality of actions for interacting with the identified object and select the best action based on historical interaction data. In some embodiments, the best action may be determined from the plurality of actions by generating an impact score for each action of the plurality of actions. In embodiments, the impact score may indicate how safe a given action is for the user when interacting with the object. Further, the impact score may be based on the potential positive or negative impact on the user or to the object itself.

In some embodiments, the system may display additional animated objects or elements using the AR device based on the impact score. For example, the AR device may display a boundary between the avatar and the identified object where the boundary indicates a distance that the user may be safely permitted in relation to the identified object when performing the action. For example, the AR device may display a safety boundary between a hazardous object and the avatar indicating how far away the user should be from the object when performing an action.

In some embodiments, the system may display a simulation of what occurs if the avatar crosses the boundary in relation to the identified object. For example, the boundary may be used to indicate that the user should stay at least 1 ft away from a hazardous object. However, the simulation may show the avatar touching the object and, as a result, the object may negatively impact the user (e.g., simulation of a cut to the avatar from a sharp object). In this way, the system will attempt to show the impact (positive/negative) that the user may cause to the object by interacting with the object or the impact that may be caused by the object on the user. By analyzing the various impact levels, the system allows the user to maintain safe interactions with any objects of interest.

In some embodiments, the system may generate a plurality of avatars if multiple objects are identified in the environment that interest the user or may be impacted by the users' actions. In some embodiments, the user may select which avatar action is displayed in relation to the multiple objects based on their preference.

The aforementioned advantages are example advantages, and not all advantages are discussed. Furthermore, embodiments of the present disclosure can exist that contain all, some, or none of the aforementioned advantages while remaining within the spirit and scope of the present disclosure.

Figure 1:
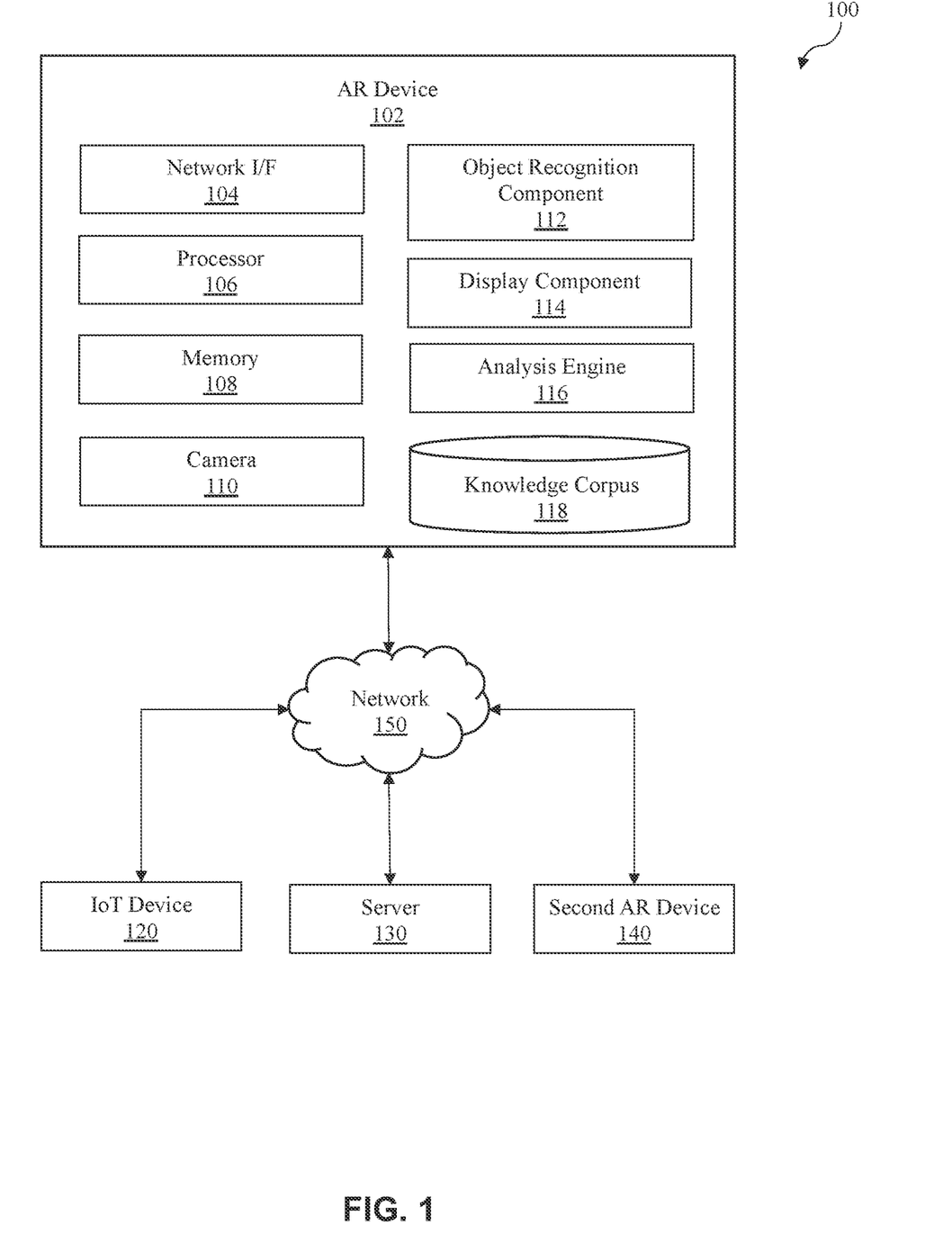
FIG. 1 illustrates an example AR visualization system, in accordance with some embodiments of the present disclosure.

With reference now to FIG. 1, shown is a block diagram of an example AR visualization system 100 in which illustrative embodiments of the present disclosure may be implemented. In the illustrated embodiment, the AR visualization system 100 includes AR device 102 that is communicatively coupled to IoT device 120, server 130, and second AR device 140 via network 150. In embodiments, AR device 102, IoT device 120, second AR device 140, and server 130 may be configured as any type of computer system and may be substantially similar to computer system 401 of FIG. 4. For example, AR device 102 and second AR device 140 may be configured as AR glasses worn by a first user and second user, respectively, while IoT device 120 may be configured as a camera and/or sensor used to generate additional video streaming data using for identifying objects in an environment. In some embodiments, AR visualization system 100 may be configured as computing environment 500 as described in FIG. 5.

In embodiments, network 150 may be any type of communication network, such as a wireless network, edge computing network, a cloud computing network, or any combination thereof (e.g., hybrid cloud network/environment). Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources over network 150.

In some embodiments, network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, AR device 102 may communicate with IoT device 120, server 130, and second AR device 140 using a WAN, one or more hardwire connections (e.g., an Ethernet cable), and/or wireless communication networks. In some embodiments, the various systems may be communicatively coupled using a combination of one or more networks and/or one or more local connections. For example, AR device 102 may communicate with server 130 through a hardwired connection, while communication between AR device 102, second AR device 140, and IoT device 120 may be through a wireless communication network.

In embodiments, AR device 102 includes processor 106 and memory 108. The AR device 102 may be configured to communicate with IT device 120, server 130, and second AR device 140 through an internal or external network interface 104. The network interface 104 may be, e.g., a modem or a network interface card. The AR device 102 may be equipped with a display or monitor. Additionally, in some embodiments, the AR device 102 may include optional input devices (e.g., a keyboard, mouse, scanner, or other input device), and/or any commercially available or custom software (e.g., browser software, communications software, server software, natural language processing/understanding software, search engine and/or web crawling software, filter modules for filtering content based upon predefined parameters, etc.).

In some embodiments, the AR device 102 may include camera 110, object recognition component 112, display component 114, analysis engine 116, and knowledge corpus 118.

In embodiments, camera 110 is configured to generate visual data (e.g., visual content of objects in an environment, visual content of other users within the environment, etc.) related to an environment. In embodiments, camera 110 may be mounted on the AR device 102. For example, the camera 110 may be mounted or disposed on a pair of AR glasses or a smartphone. In some embodiments, the camera 110 may be a standalone camera (IoT device 120) that generates and sends visual data to AR device 102. In some embodiments, the IoT device 120 may generate non-visual data used to identify the given object. For example, the IoT device 120 may be configured as a motion sensor, proximity sensor, radio frequency (RF) sensor, and the like.

In embodiments, object recognition component 112 is configured to analyze (e.g., using image recognition algorithms) the visual data generated by the camera 110 to identify and determine what a given object is from the visual data feed/stream. For example, the object recognition component 112 may identify a plurality of objects within the visual data and determine what the given objects are by comparing the detected objects to knowledge corpus 118 of known/similar objects and/or object properties.

In embodiments, the analysis engine 116 may determine which objects of the identified objects are recognized objects that the user is interested in viewing. This may be determined based on a user interest level or score for a set of known objects. The user interest level may be generated by performing a user profile analysis based on user input preferences and/or analyzing unstructured data from the user's social media channel/feed. For example, the user may be interested in viewing various plants or animals in an environment as indicated by the user's social media feed, and the system will determine which identified objects match with the user interest level.

In embodiments, the analysis engine 116 may determine various properties related to the identified objects. This may be performed by utilizing the knowledge corpus 118 and/or searching one or more public domains or databases maintained on server 130. For example, the analysis engine 116 may determine that an identified plant from the visual data may be poisonous based on various properties and/or information maintained in the knowledge corpus 118. In some embodiments, the analysis engine 116 will attempt to recognize and/or identify each object in the surrounding environment and will be determine which objects the user may be interested in or can cause any impact to the user. The analysis engine 116 may rank or score the objects based on user's level of interest in those objects. Using the ranking, the analysis engine 116 may identify and display only specific information to the user that is limited to the user's interest. Further, the analysis engine 116 may identify the types of properties of the object and rank the impact those properties may have on the user. For example, the analysis engine 116 may rank a pot of boiling water as a high impact level or value, and a cup of ice water as a low impact level. In some embodiments, the impact of the object and/or its properties may be used to determine which avatar actions are displayed to the user.

In some embodiments, the analysis engine 116 may utilize crowdsourced data from other AR devices, such as second AR device 140, to identify what type of actions are best for interacting with the identified object(s). For example, the analysis engine 116 may receive crowdsourced data that include visual data of a second user interacting with identified objects in the environment and use this visual data to generate an avatar for interacting with the identified object that is displayed to the first user using AR device 102. For example, the crowdsourced data may be used to determine what the best angle, direction, distance, etc. for interacting with the object based on the data and use this information to generate the avatar for interacting with the object. For example, crowdsourced data may show multiple users taking pictures of a given object and based on an analysis of the visual data (e.g., image data, metadata, camera settings, etc.), the system may determine the best angle/distance with respect to the object that the user should take in order to get the best picture.

In some embodiments, the analysis engine 116 will identify a distance for the user to maintain in relation to the identified object(s). For example, if the identified object is hazardous to the user, the analysis engine 116 will determine a defined distance for the user to maintain away from the identified object. For example, the identified object may be a wild animal, and the analysis engine may utilize crowdsourced data and/or knowledge corpus 118 to determine that the user should maintain a determined distance of 10 feet from the animal. In some embodiments, the analysis engine 116 will use crowdsourced data to determine what type of actions other users have done in relation to the identified object and rank the best action based on its impact on the object. In some embodiments, the analysis engine 116 may identify if the user has specified any guidelines or configurations, such as the user is interested in capturing scenic photos from a distance. Using this information, the analysis engine 116 may display avatars performing actions in appropriate locations at the determined distance in the environment based on the user's specifications.

In embodiments, the display component 114 is configured to display one or more avatars performing an action for interacting with the identified object. For example, the display component 114 may display an avatar taking a picture of the object from a predetermined distance. In another example, the display component 114 may show an avatar picking up the object and examining it. In some embodiments, the display component 114 (e.g., display on AR glasses or AR interface) of the respective user will show a required number of human and non-human avatars (e.g., phone avatar, animal, simulated object, etc.) in the visual surrounding in AR interface. For example, the display component 114 may show two avatars if two users are using the system or if multiple actions may be performed on the identified object(s).

In some embodiments, the display component 114 may show the avatar and the virtual action of the avatar with respect to a defined boundary around the identified object. In some embodiments, the display component 114 may simulate what happens to the avatar if the avatar crosses the boundary. In some embodiments, the AR device 102 may send an audible alert and/or vibration (via haptic sensor) to IoT device 120 to further alert the user that they are approaching the boundary when performing the action shown by the avatar.

In embodiments, knowledge corpus 118 may be used to store, access, and/or update data for making object recognition decisions related to displaying actions related to identified objects. For example, knowledge corpus 118 may store various historic visual data and/or sensor data related to detecting and/or determining the presence of objects within an environment. The AR device 102 may use the historic data to train or improve accuracy in displaying AR visualization of a user action on an identified and/or recognized object.

For example, analysis engine 116 may use machine learning algorithms/models to improve detection and displaying capabilities automatically through experience and/or repetition without procedural programming. For example, the analysis engine 116 may use machine learning to analyze historical visual data of user movements and/or trajectories when moving through the environment and improve displaying avatars for performing appropriate actions according to those movements. In embodiments, a machine learning model may be trained to identify based on analyzing historic image data of users' movements in the environment (e.g., analyzing body movements of the users' extremities, neck, eyes, etc. while physically interacting with objects within the environment in prior instances) that certain motions and/or body movements can be used to predict the best actions for interacting with the given objects in the environment. Based on the analyzing, the system may be trained to recognize and/or predict the best actions and/or positional movements for users within the environment that have minimal impact on the user and/or the object itself. Using the trained machine learning model, allows to system to predict where the best location to display the avatar in relation to the identified object on the AR display. In this way, the analysis engine 116 can automatically improve accuracy in displaying avatar actions for interacting with objects using machine learning algorithms.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), nonnegative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an exemplary AR visualization system 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates an AR visualization system 100 with a single AR device 102, a single IoT device 120, a single server 130, a single second AR device 140, and a single network 150, suitable computing environments for implementing embodiments of this disclosure may include any number of AR visualization systems, AR devices, IoT devices, servers, and networks. The various modules, systems, and components illustrated in FIG. 1 may exist, if at all, across a plurality of AR visualization systems, AR devices, IoT devices, servers, and networks.

Figure 2A:
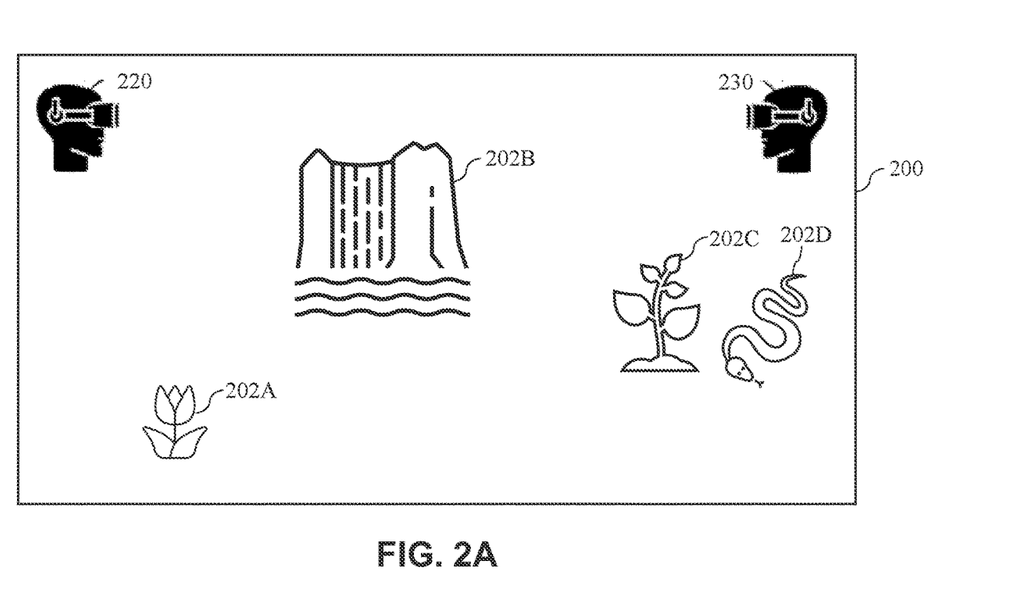
FIG. 2A and FIG. 2B illustrate example diagrams for displaying AR visualization of a user action on an identified object, in accordance with some embodiments of the present disclosure.
Figure 2B:
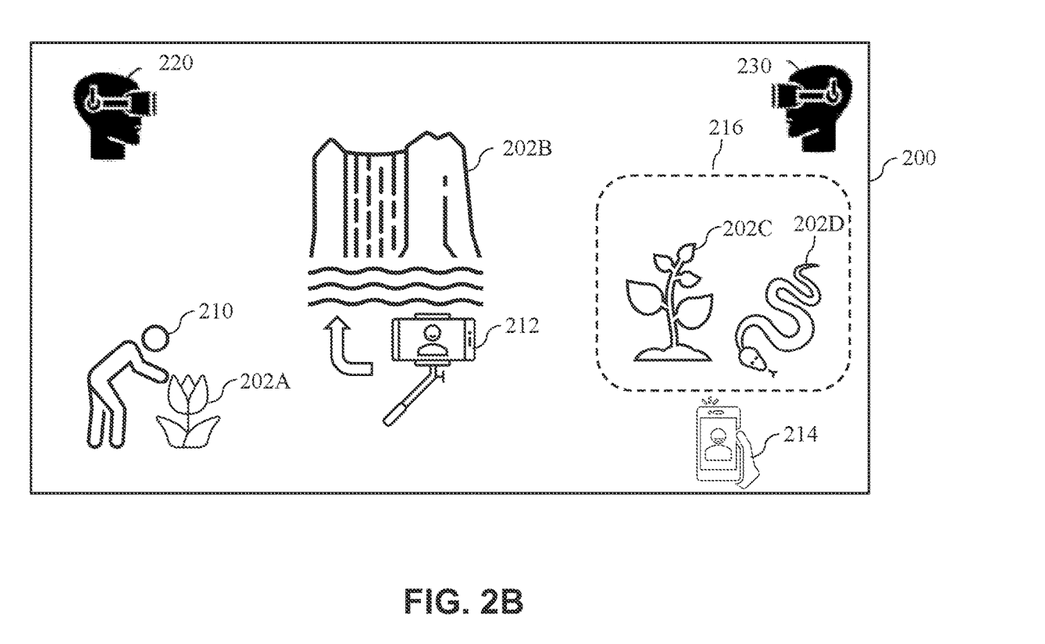

Referring now to FIG. 2A and FIG. 2B, shown are example diagrams for displaying AR visualization of a user action on an identified and/or recognized object, in accordance with some embodiments of the present disclosure. In the illustrated embodiment, object 202A, object 202B, object 202C, and object 202D (collectively referred to as objects 202) are identified from visual data of environment 200. The visual data of environment 200 may be generated from one or more cameras communicatively coupled to AR device 220. AR device 220 will determine the properties and interest level for each of the identified objects 202 by comparing the identified objects 202 to user preferences/interests as applied to a plurality of known objects. The object's properties may be determined by searching and analyzing properties of known objects that are similar to the identified objects 202 in the environment 200. The AR device 220 will display or identify only objects to the user that meet an interest level threshold. Other detected objects that do not meet the interest level threshold may be ignored or disregarded.

For example, object 202A may be identified as a flower and the user may be interested in picking flowers that are non-poisonous based on the user's interests/preferences. The AR device 220 may analyze the identified object and determine that the flower is safe to pick up by the user based on known properties of similar/matching flowers from searching an object database. Using the AR display, the AR device 220 will generate and display an avatar 210 performing an action as illustrated in FIG. 2B, showing that it is safe for the user to pick up object 202A. In some embodiments, the AR device 220 may collect crowdsourced data from other AR devices, such as second AR device 230, and use this crowdsourced data to generate best actions for interacting with the objects 202. For example, AR device 220 may generate actions based on crowdsourced data from AR device 230 which may show that a second user has picked the flower safely or has found similar flowers in an unseen locations (e.g., not shown in the first user's visual data). In this way, the avatar may display actions directing the first user to the flowers based on the second user's actions.

In some embodiments, the generated action may include a best action for interacting with the objects 202, where the best action includes a determined approach direction, distance, and angle, for performing an action in relation to the given object For example, object 202B may be a scenic waterfall and the user may be interested in taking scenic pictures. The AR device 220 may analyze the identified object 202B and determine where the best location (distance and angle from the waterfall) for the user to take the picture should be based on crowdsourced data obtained from second AR device 230. For example, the system may analyze historical pictures or visual content taken at that location and determine visually where the best angle and direction may be to get the clearest picture of object 202B. This may be based on various digital photograph/content metadata, social media information such as likes, and/or various users' textual input regarding pictures and/or visual content at the location. Using the AR display, the AR device 220 will generate and display an avatar 212 showing that the best place to take a picture of object 202B is to follow the arrow to the left side of the waterfall. In this way, the system may use a collaborative approach with other AR devices and/or second users to determine the best action for the user to make with respect to identified objects 202 in the environment 200 and display those actions using the avatar.

In another example, objects 202C and 202D may be a poisonous plant and snake, respectively, in which the user has an interest in photographing. The AR device 220 may analyzed the identified objects 202C and 202D and determine based on information from the public domain that these objects are hazardous to humans. Using the AR display, the AR device 220 will generate and display an avatar 214 showing that the safest place to take a picture of objects is outside of boundary 216. In some embodiments, the AR device 220 may simulate and display what happens if the avatar crosses boundary 216. For example, the AR device 220 may simulate the avatar being itchy as a result of touching object 202C or being bit by object 202D when getting too close/within the boundary. The simulation may be based on visual data obtained or collected from second AR device 230 showing other users interacting/impacting objects when performing historical actions. In this way, the system may utilize a collaborative approach to generating and displaying what actions are safe to perform in relation to given objects 202 based on crowdsourced and/or historical action data.

Figure 3:
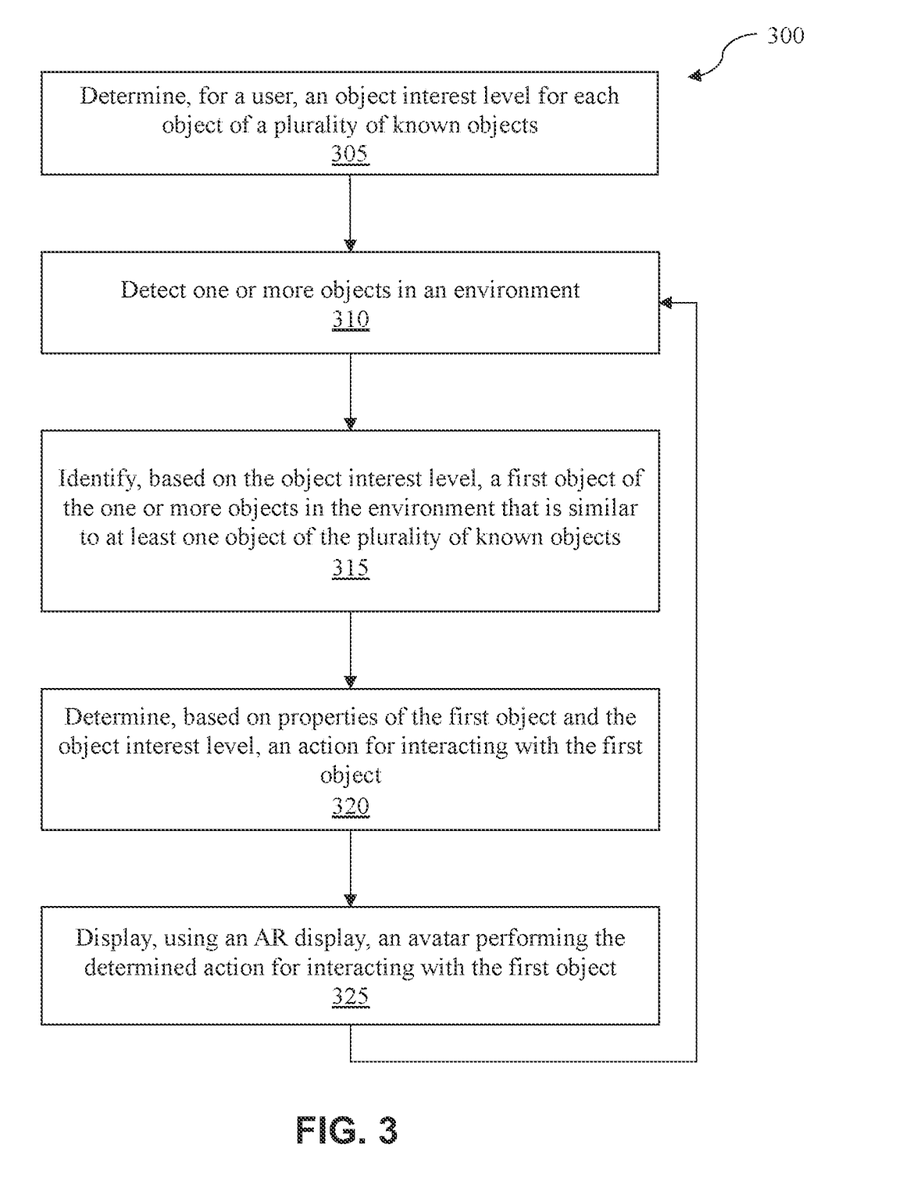
FIG. 3 illustrates an example process for displaying AR visualization of a user action on an identified object, in accordance with some embodiments of the present disclosure.

Referring now to FIG. 3, shown is an example process 300 for displaying AR visualization of a user action on an identified and/or recognized object, in accordance with some embodiments of the present disclosure. The process 300 may be performed by processing logic that comprises hardware (e.g., circuitry, dedicated logic, programmable logic, microcode, etc.), software (e.g., instructions run on a processor), firmware, or a combination thereof. In some embodiments, the process 300 is a computer-implemented process. In embodiments, the process 300 may be performed by processor 106 of AR device 102 exemplified in FIG. 1.

In embodiments, the process 300 begins by determining, for a user, an object interest level for each object of a plurality of known objects. This is illustrated at step 305. For example, the system may collect and/or receive user data related to interest in various objects from various sources such as inputted user preferences, social media data streams, and/or user profile data. For example, a user may be interested in detecting hazardous objects when traversing an unknown environment (forest, jungle, etc.) but may also be interested in taking wildlife pictures. Therefore, known objects that are hazardous will be given a high interest level (in order to avoid these objects) in addition to various known wildlife objects (animals, plants, scenic views, etc.) within the environment.

The process 300 continues by detecting one or more objects in an environment. This is illustrated at step 310. In embodiments, the system detects the one or more objects by analyzing one or more visual data streams using image recognition algorithms. For example, as the user traverses an environment using an AR device, the system will analyze the visual data stream that is generated by one or more communicatively coupled cameras. The system will identify various objects within the data stream. In some embodiments, the system may detect the objects via non-visual data, such as through various sensors (e.g., motion detection, proximity sensor, etc.).

The process 300 continues by identifying, based on the object interest level, a first object of the one or more objects in the environment that is similar to at least one object of the plurality of known objects. This is illustrated at step 315. In embodiments, the system is configured to limit the detected one or more objects to only objects that the user is interested in based on the interest level. This is performed by comparing detected objects to known objects that the user is interested in based on the interest level and identifying those objects in the visual data stream. Returning to the example above, the system will identify any hazardous objects that are within the environment and/or any wildlife objects or views that may interest the user based on the user interest level that was determined above. Objects that are detected but do not have an interest level designation may be ignored by the system. In some embodiments, the system may use crowdsourced visual data from a second AR device to identify objects that may not be captured by the user's AR device's visual data stream. For example, the system may analyze visual data from a second user that has traversed the environment using a second AR device prior to or in conjunction with the first user. Using the second user's visual data may allow the first user's AR device to alert the user to an object(s) of interest that is identified using the second user's crowdsource data that may not have been detected in the first user's visual data stream.

The process 300 continues by determining, based on properties of the first object and the object interest level, an action for interacting with the first object. This is illustrated at step 320. Once the object is identified, the system may determine how the user should interact with the identified object. For example, based on a knowledgebase of known properties and the user's interests, the system will determine the appropriate action for interacting with the object. Returning to the example above, if the identified object is a wild animal that is determined to be hazardous to the user (based on known properties of the animal, such as a propensity to charge a human or scare easily, that are obtained by searching an object database) the system may determine that the best action is to veer in a certain direction to avoid coming near the animal. However, because the user is also interested in wildlife photography, the system may also determine a best spot for taking a picture (at a determined distance/angle) of the wildlife.

In embodiments, the determination of the action for interacting with the first object may be based on crowdsourced data associated with the first object or similar objects. For example, the system may analyze crowdsourced data that includes a plurality of actions for interacting with the first object and select the best action based on historical interaction data. In embodiments, the best action may be determined from the plurality of actions by generating an impact score for each action of the plurality of actions. In embodiments, the impact score may indicate how safe a given action is for the user when interacting with the object. Further, the impact score may be based on the potential positive or negative impact on the user or to the object. For example, a high impact score may be given to action that requires the user to come in close proximity of a hazardous object (picking up a sharp object/examining an object, holding a fragile object). While a low impact score may be given to an action that requires the user to have minimal contact with the object (e.g., taking a picture of the object). In some embodiments, the impact score may be based on further criteria such as how much the action impacts the integrity of the object. For example, the action of picking up a fragile object such as a flower may have a high impact score on the object (e.g., the flower) because the user removes it from the ground or stem, thus leaving it broken.

The process 300 continues by displaying, using an AR display, an avatar performing the determined action for interacting with the first object. This is illustrated at step 325. In embodiments, the AR display may be in the form of a pair of AR goggles/glasses, a smartphone, an AR screen, etc., however, these are not meant to be limiting. For example, the avatar will be displayed on the AR device and shown interacting with the first object based on the selected best action for the user. Returning to the previous example, the AR device will display an avatar veering toward a direction away from the wild animal. Further, the avatar will show a location to take a photograph of the animal at a proper angle and distance (based on crowdsourced data). For example, the system may analyze other user's AR devices and/or photographs to determine proper angle and direction for the best photographs. This may be based on analyzed metadata parameters from historical digital photographs and/or an amount of social media likes of the crowdsourced photographs.

In some embodiments, the system may display additional animated objects or elements using the AR device based on the impact score. For example, the impact level of the user may be high with respect to a fragile object. The AR device may display an avatar showing a simulated user interacting with the fragile object and breaking it if handled improperly. By analyzing the various impact levels, the system allows the user to maintain safe interactions with any objects of interest. In some embodiments, the AR device may display a boundary between the avatar and the first object where the boundary indicates a distance that the user may be safely permitted in relation to the first object when performing the action. For example, the AR device may display an animated boundary between the animal and the avatar indicating how far away the user should be from the animal when taking the photograph. In some embodiments, the system may display a simulation of what happens if the avatar crosses the boundary in relation to the first object. For example, the boundary may be used to indicate the user should stay at least 3 feet away from a poisonous plant. However, the simulation may show the avatar touching the plant and, as a result, having a skin reaction from the contact. In this way, the system will attempt to show the impact (positive/negative) that the user may cause to the object by interacting with the object or the impact that may be caused by the object on the user. In some embodiments, the simulation may be generated in part by analyzing historical visual content of various interactions of similar users and/or similar objects and recreating the avatar and avatar actions based on those interactions. In some embodiments, the simulation of the avatar may be generated using various computer animation techniques (e.g., digital twin modeling based on previous users and interaction).

In some embodiments, the process 300 continues by returning to step 310. For example, the AR device will continually monitor and detect objects within the environment. This allows the AR device to continuously inform the user of additionally identified objects within the environment that may interest the user. In some embodiments, the process 300 may return to step 305 in the event that the user has updated or modified their interest regarding various objects. In some embodiments, the interest level may be manually modified by the user or automatically modified based on analyzing updates to a user's social media feed or channel.

For example, the system may utilize natural language processing/understanding to analyzing unstructured textual data of the user's social media feed to identify various objects that the user indicates they are interested in. For example, the user's social media feed may indicate that the user has started hiking as a new hobby. The system will automatically update the user interest level in order to identify hiking trails when the user is traversing an outdoor environment. The system may utilize various crowdsourced data to identify hiking trails within the environment and direct the user to the best trails by displaying the avatar in the proper direction on the AR device. In some embodiments, the system will analyze image data from user posts on their social media feed to determine their interest. For example, the user may post pictures of various birds on their social media feed. The system will analyze the pictures using image recognition and identify any similar birds from the user's AR device's visual data feed when traversing the environment. In this way, the system automatically keeps up to date with the user's interests with limited manual input.

Figure 4:
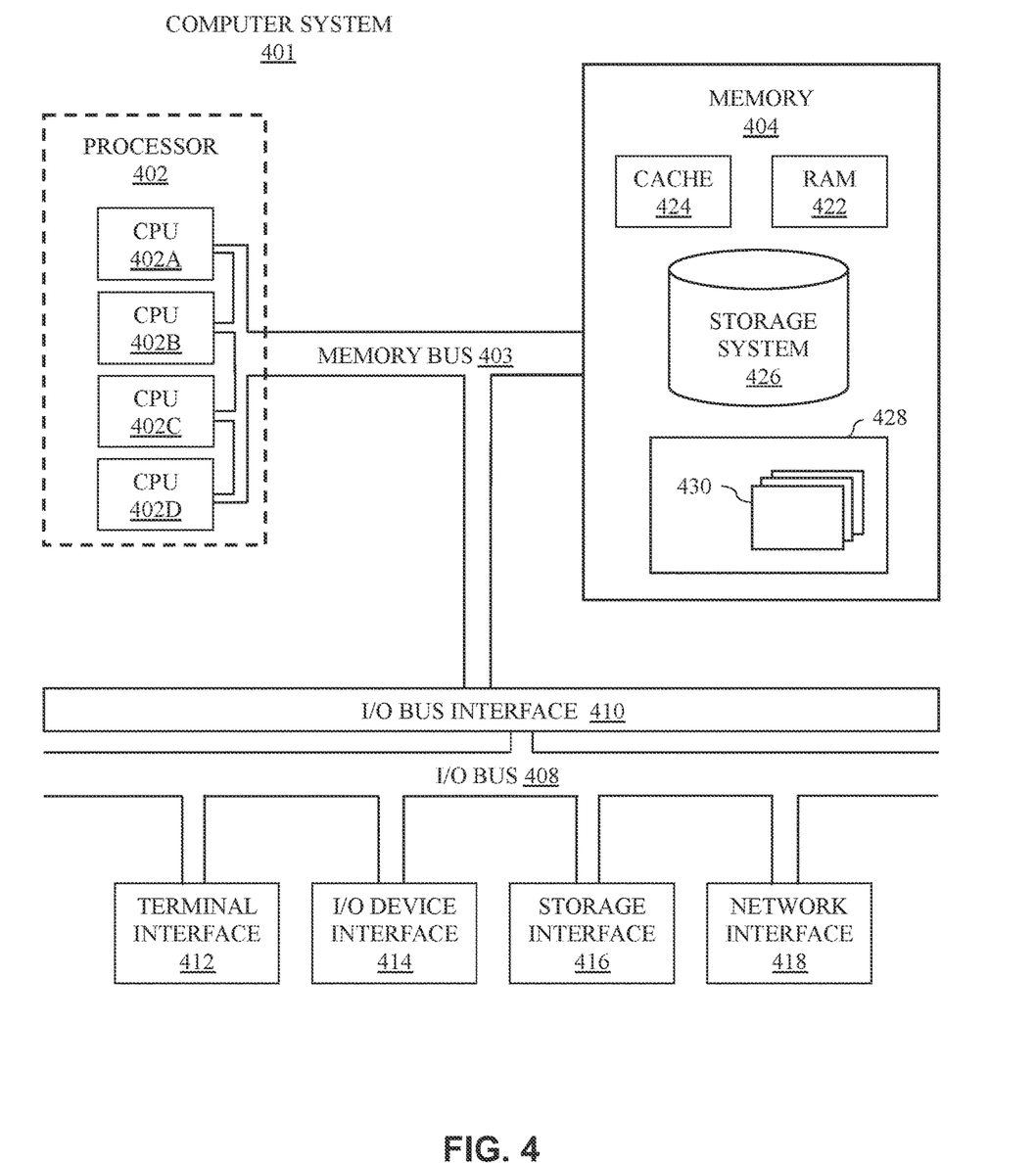
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache. In some embodiments, a processor can include at least one or more of, a memory controller, and/or storage controller. In some embodiments, the CPU can execute the processes included herein (e.g., process 300 as described in FIG. 3). In some embodiments, the computer system 401 may be configured as AR visualization system 100 of FIG. 1.

System memory subsystem 404 may include computer system readable media in the form of volatile memory, such as random-access memory (RAM) 422 or cache memory 424. Computer system 401 may further include other removable/non-removable, volatile/non-volatile computer system data storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 404 can include flash memory, e.g., a flash memory stick drive or a flash drive. Memory devices can be connected to memory bus 403 by one or more data media interfaces. The memory subsystem 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single units, the computer system 401 may, in some embodiments, contain multiple I/O bus interfaces 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory subsystem 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 428 and/or program modules 430 generally perform the functions or methodologies of various embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
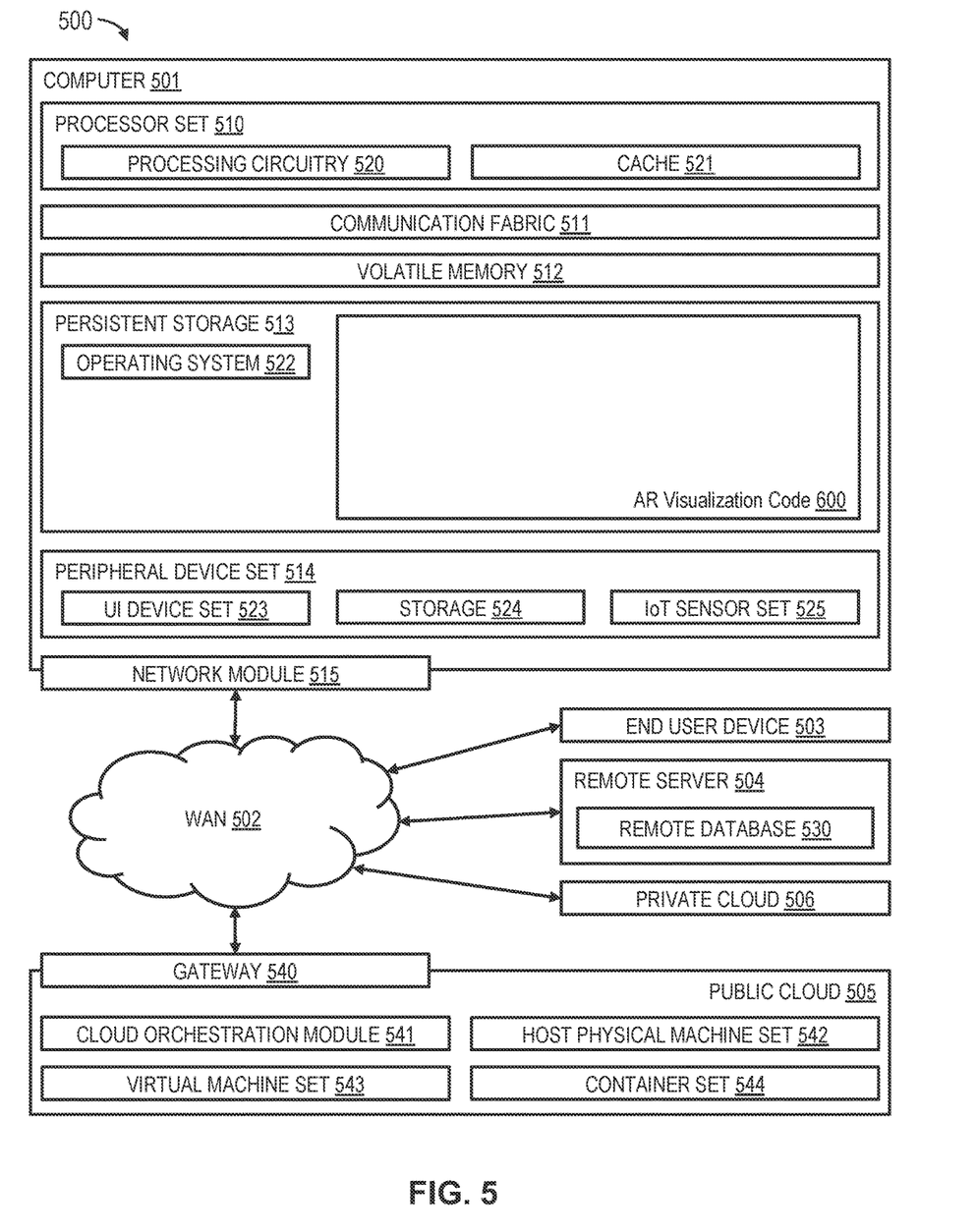
FIG. 5 depicts a schematic diagram of a computing environment for executing program code related to the methods disclosed herein and for displaying AR visualization of a user action on an identified object, according to at least one embodiment.

Embodiments of the present disclosure may be implemented together with virtually any type of computer, regardless of the platform is suitable for storing and/or executing program code. FIG. 5 shows, as an example, a computing environment 500 (e.g., cloud computing system) suitable for executing program code related to the methods disclosed herein and for circuit design automation. In some embodiments, the computing environment 500 may be the same as or an implementation of the AR visualization system 100 of FIG. 1.

Computing environment 500 contains an example of an environment for the execution of at least some of the computer code involved in performing the inventive methods, such as AR visualization code 600. The AR visualization code 600 may be a code-based implementation of the AR visualization system 100.

In addition to AR visualization code 600, computing environment 500 includes, for example, a computer 501, a wide area network (WAN) 502, an end user device (EUD) 503, a remote server 504, a public cloud 505, and a private cloud 506. In this embodiment, the computer 501 includes a processor set 510 (including processing circuitry 520 and a cache 521), a communication fabric 511, a volatile memory 512, a persistent storage 513 (including operating a system 522 and the AR visualization code 600, as identified above), a peripheral device set 514 (including a user interface (UI) device set 523, storage 524, and an Internet of Things (IOT) sensor set 525), and a network module 515. The remote server 504 includes a remote database 530. The public cloud 505 includes a gateway 540, a cloud orchestration module 541, a host physical machine set 542, a virtual machine set 543, and a container set 544.

The computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as the remote database 530. As is well understood in the art of computer technology, and depending upon the technology, performance of a computer-implemented method may be distributed among multiple computers and/or between multiple locations. On the other hand, in this presentation of the computing environment 500, detailed discussion is focused on a single computer, specifically the computer 501, to keep the presentation as simple as possible. The computer 501 may be located in a cloud, even though it is not shown in a cloud in FIG. 1. On the other hand, the computer 501 is not required to be in a cloud except to any extent as may be affirmatively indicated.

The processor set 510 includes one, or more, computer processors of any type now known or to be developed in the future. The processing circuitry 520 may be distributed over multiple packages, for example, multiple, coordinated integrated circuit chips. The processing circuitry 520 may implement multiple processor threads and/or multiple processor cores. The cache 521 is memory that is located in the processor chip package(s) and is typically used for data or code that should be available for rapid access by the threads or cores running on the processor set 510. Cache memories are typically organized into multiple levels depending upon relative proximity to the processing circuitry. Alternatively, some, or all, of the cache for the processor set may be located "off chip." In some computing environments, the processor set 510 may be designed for working with qubits and performing quantum computing.

Computer readable program instructions are typically loaded onto the computer 501 to cause a series of operational steps to be performed by the processor set 510 of the computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as the cache 521 and the other storage media discussed below. The program instructions, and associated data, are accessed by the processor set 510 to control and direct performance of the inventive methods. In the computing environment 500, at least some of the instructions for performing the inventive methods may be stored in the AR visualization code 600 in the persistent storage 513.

The communication fabric 511 is the signal conduction path that allows the various components of the computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 512 is any type of volatile memory now known or to be developed in the future. Examples include dynamic type random access memory (RAM) or static type RAM. Typically, the volatile memory 512 is characterized by random access, but this is not required unless affirmatively indicated. In the computer 501, the volatile memory 512 is located in a single package and is internal to the computer 501, but, alternatively or additionally, the volatile memory may be distributed over multiple packages and/or located externally with respect to the computer 501.

The persistent storage 513 is any form of non-volatile storage for computers that is now known or to be developed in the future. The non-volatility of this storage means that the stored data is maintained regardless of whether power is being supplied to the computer 501 and/or directly to the persistent storage 513. The persistent storage 513 may be a read only memory (ROM), but typically at least a portion of the persistent storage allows writing of data, deletion of data and re-writing of data. Some familiar forms of persistent storage include magnetic disks and solid state storage devices. The operating system 522 may take several forms, such as various known proprietary operating systems or open source Portable Operating System Interface-type operating systems that employ a kernel. The code included in the AR visualization code 600 typically includes at least some of the computer code involved in performing the inventive methods.

The peripheral device set 514 includes the set of peripheral devices of the computer 501. Data communication connections between the peripheral devices and the other components of the computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, the UI device set 523 may include components such as a display screen, speaker, microphone, wearable devices (such as goggles and smart watches), keyboard, mouse, printer, touchpad, game controllers, and haptic devices. The storage 524 is external storage, such as an external hard drive, or insertable storage, such as an SD card. The storage 524 may be persistent and/or volatile. In some embodiments, the storage 524 may take the form of a quantum computing storage device for storing data in the form of qubits. In embodiments where the computer 501 is required to have a large amount of storage (for example, where the computer 501 locally stores and manages a large database) then this storage may be provided by peripheral storage devices designed for storing very large amounts of data, such as a storage area network (SAN) that is shared by multiple, geographically distributed computers. The IoT sensor set 525 is made up of sensors that can be used in Internet of Things applications. For example, one sensor may be a thermometer and another sensor may be a motion detector.

The network module 515 is the collection of computer software, hardware, and firmware that allows the computer 501 to communicate with other computers through the WAN 502. The network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of the network module 515 are performed on the same physical hardware device. In other embodiments (for example, embodiments that utilize software-defined networking (SDN)), the control functions and the forwarding functions of the network module 515 are performed on physically separate devices, such that the control functions manage several different network hardware devices. Computer readable program instructions for performing the inventive methods can typically be downloaded to the computer 501 from an external computer or external storage device through a network adapter card or network interface included in the network module 515.

The WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device (EUD) 503 is any computer system that is used and controlled by an end user (for example, a customer of an enterprise that operates the computer 501), and may take any of the forms discussed above in connection with the computer 501. The EUD 503 typically receives helpful and useful data from the operations of the computer 501. For example, in a hypothetical case where the computer 501 is designed to provide a recommendation to an end user, this recommendation would typically be communicated from the network module 515 of the computer 501 through the WAN 502 to the EUD 503. In this way, the EUD 503 can display, or otherwise present, the recommendation to an end user. In some embodiments, the EUD 503 may be a client device, such as thin client, heavy client, mainframe computer, desktop computer and so on.

The remote server 504 is any computer system that serves at least some data and/or functionality to the computer 501. The remote server 504 may be controlled and used by the same entity that operates computer 501. The remote server 504 represents the machine(s) that collect and store helpful and useful data for use by other computers, such as the computer 501. For example, in a hypothetical case where the computer 501 is designed and programmed to provide a recommendation based on historical data, then this historical data may be provided to the computer 501 from the remote database 530 of the remote server 504.

The public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of the public cloud 505 is performed by the computer hardware and/or software of the cloud orchestration module 541. The computing resources provided by the public cloud 505 are typically implemented by virtual computing environments that run on various computers making up the computers of the host physical machine set 542, which is the universe of physical computers in and/or available to the public cloud 505. The virtual computing environments (VCEs) typically take the form of virtual machines from the virtual machine set 543 and/or containers from the container set 544. It is understood that these VCEs may be stored as images and may be transferred among and between the various physical machine hosts, either as images or after instantiation of the VCE. The cloud orchestration module 541 manages the transfer and storage of images, deploys new instantiations of VCEs and manages active instantiations of VCE deployments. The gateway 540 is the collection of computer software, hardware, and firmware that allows the public cloud 505 to communicate through the WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 506 is similar to the public cloud 505, except that the computing resources are only available for use by a single enterprise. While the private cloud 506 is depicted as being in communication with the WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, the public cloud 505 and the private cloud 506 are both part of a larger hybrid cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some embodiments, one or more of the operating system 522 and the AR visualization code 600 may be implemented as service models. The service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   determining, for a user, an object interest level for each object of a plurality of known objects;
   detecting one or more objects in a real-world environment;
   identifying, based on the object interest level, a first object of the one or more objects in the real-world environment that is similar to at least one object of the plurality of known objects;
   determining a best action from a plurality of possible actions for interacting with the first object, the determining based on properties of the first object, at least one user action preference of the user, the object interest level, and impact scores for each possible action that indicate how safe the possible actions are for the user when interacting with the first object;
   displaying, using an augmented reality (AR) display, an avatar performing the determined best action for interacting with the first object;
   displaying a boundary between the avatar and the first object, wherein the boundary indicates a distance the user may be in relation to the first object when performing the action; and
   displaying, based on the avatar crossing the boundary, a simulation of the avatar impacting or being impacted by the first object, wherein the displaying the boundary and the displaying the simulation are based on the impact scores.

2. The computer-implemented method of claim 1, wherein the AR display comprises a pair of AR glasses.

3. The computer-implemented method of claim 1, wherein determining the best action for interacting with the first object is further based on crowdsourced data associated with the first object.

4. The computer-implemented method of claim 3, wherein the determining the best action for interacting with the first object from the plurality of actions further comprises:
    determining the impact score for each action of the plurality of actions; and
    selecting, based on the impact score for each action, the best action.

5. The computer-implemented method of claim 4, wherein the first object is a fragile object, and the simulation shows the avatar breaking the first object.

6. The computer-implemented method of claim 3, wherein the best action includes a determined distance and angle for approaching the first object.

7. The computer-implemented method of claim 1, wherein determining the object interest level for each object of a plurality of known objects comprises analyzing object preferences from a user profile and a social media channel.

8. The computer-implemented method of claim 1, wherein the properties of the first object are determined by searching a database of known properties related to similar known objects.

9. The computer-implemented method of claim 1, wherein detecting the one or more objects in the environment is performed by analyzing a video stream using image recognition.

10. A system comprising:
    a processor; and
    a computer-readable storage medium communicatively coupled to the processor and storing program instructions which, when executed by the processor, cause the processor to perform a method comprising:
        determining, for a user, an object interest level for each object of a plurality of known objects;
        detecting one or more objects in a real-world environment;
        identifying, based on the object interest level, a first object of the one or more objects in the real-world environment that is similar to at least one object of the plurality of known objects;
        determining a best action from a plurality of possible actions for interacting with the first object, the determining based on properties of the first object, at least one user action preference of the user, and the object interest level, and impact scores for each possible action that indicate how safe the possible actions are for the user when interacting with the first object;
        displaying, using an augmented reality (AR) display, an avatar performing the determined best action for interacting with the first object;
        displaying a boundary between the avatar and the first object, wherein the boundary indicates a distance the user may be in relation to the first object when performing the action; and
        displaying, based on the avatar crossing the boundary, a simulation of the avatar impacting or being impacted by the first object, wherein the displaying the boundary and the displaying the simulation are based on the impact scores.

11. The system of claim 10, wherein the AR display comprises a pair of AR glasses.

12. The system of claim 10, wherein determining the best action for interacting with the first object is further based on crowdsourced data associated with the first object.

13. The system of claim 12, wherein the determining the best action for interacting with the first object from the plurality of actions further comprises:
    determining the impact score for each action of the plurality of actions; and
    selecting, based on the impact score for each action, the best action.

14. A computer program product comprising a computer-readable storage medium having program instructions embodied therewith, the program instructions executable by a processor to cause the processor to perform a method comprising:
    determining, for a user, an object interest level for each object of a plurality of known objects;
    detecting one or more objects in a real-world environment;
    identifying, based on the object interest level, a first object of the one or more objects in the real-world environment that is similar to at least one object of the plurality of known objects;
    determining a best action from a plurality of possible actions for interacting with the first object, the determining based on properties of the first object, at least one user action preference of the user, the object interest level, and impact scores for each possible action that indicate how safe the possible actions are for the user when interacting with the first object;
    displaying, using an augmented reality (AR) display, an avatar performing the determined best action for interacting with the first object;
    displaying a boundary between the avatar and the first object, wherein the boundary indicates a distance the user may be in relation to the first object when performing the action; and
    displaying, based on the avatar crossing the boundary, a simulation of the avatar impacting or being impacted by the first object, wherein the displaying the boundary and the displaying the simulation are based on the impact scores.

15. The computer program product of claim 14, wherein the AR display comprises a pair of AR glasses.

16. The computer program product of claim 14, wherein determining the best action for interacting with the first object is further based on crowdsourced data associated with the first object.

17. The computer program product of claim 16, wherein the determining the best action for interacting with the first object from the plurality of actions further comprises:
    determining the impact score for each action of the plurality of actions; and
    selecting, based on the impact score for each action, the best action.

* * * * *